UNITED STATES PATENT OFFICE.

FEODOR LEHMANN AND JOHANNES STOCKER, OF BERLIN, GERMANY.

PROCESS OF MANUFACTURING VEGETABLE GLUE.

1,089,064.   Specification of Letters Patent.   Patented Mar. 3, 1914.

Application filed July 13, 1909. Serial No. 507,491.

*To all whom it may concern:*

Be it known that we, FEODOR LEHMANN and JOHANNES STOCKER, subjects of the German Emperor, residing at Berlin, Germany, have invented new and useful Improvements in Processes of Manufacturing Vegetable Glues, of which the following is a specification.

The present invention relates to the manufacture of an improved vegetable glue from seaweed or bladder-wrack, agar-agar, or other alga, which forms an excellent substitute for glues made from bones, leather, and cartilage (chondrin).

Our invention is based upon the observation we have made, that by treating with a dilute acid the colloidal matter or gelatin of seaweed, in conjunction with an agglutinant, such as dextrin, or an astringent, such as tannin, the gelatinous mass acquires the adhesive quality of a good grade joiner's glue.

The new vegetable glue may in practice be manufactured for instance, in the following manner. To a sufficient quantity of water some alum, or other substance which promotes swelling up in water, is added, and about 500 grams of bladder-wrack or other alga placed in the liquid and allowed to swell up, whereupon the water is poured off. The mass remaining is then boiled until it has thoroughly dissolved, and thereupon filtered. About 10 grams of 50 per cent. acetic acid and 20 grams of dextrin, or 20 grams of tannin, are now added, and after complete dissolution, the mass is further treated in the same manner as is usual in the manufacture of bone-glue, heat being applied for a considerable period of time.

For the purpose of depriving the product of its brittleness, and thus preventing it on change of temperature, from cracking and scaling off the surface to which it has been applied, a certain quantity of glycerin or glucose is added.

The new product, like animal glue made from leather, bones or cartilage, is not only suitable for uniting wood, etc., but can also be employed for divers technical purposes. For instance there can be made from it a gelatin for sculptors, or a mass suitable for printers' rollers and hectographs.

The new glue might also be prepared as follows: The seaweeds or algæ to be used are dried and pulverized, and the resultant powder treated in the same manner as the seaweed-gelatin in the above described process, without the cellulose of the plant being separated by filtration from the colloidal matter contained therein. In this way the entire plant can be utilized for the production of the glue.

The treatment of the seaweed for the production of glue differs from that in the familiar process of treating the same, inasmuch as the seaweed mass is in no wise attacked or decomposed by the action of chemicals, such as acids and alkalis whereby, as is well-known, a product is obtained which is soluble even in cold water and may perhaps be employed as a material for finishing or dressing purposes, or for uniting paper, etc. The mass obtained according to the new process is insoluble in cold water, and it is only after boiling in water that it acquires the property of joining wood, a quality possessed by none of the so-called agglutinants previously prepared from seaweed. Furthermore, by the addition of certain substances to the mass, properties may be imparted to it just as with ordinary joiner's glue.

Although definite quantities of certain ingredients have been recited in this specification, it must be understood that we do not desire to restrict ourselves to such proportions.

Having thus described our invention, we declare that what we claim as new and desire to secure by Letters Patent is:—

1. The process of manufacturing a vegetable glue, consisting in treating seaweed with dilute acid, and an astringent, substantially as described.

2. The process of manufacturing a vegetable glue, consisting in treating the colloidal matter of seaweed with dilute acid, and an astringent, as tannin, substantially as described.

3. The process of manufacturing a vegetable glue, consisting in treating the colloidal matter of seaweed with dilute acid, and an astringent, and in finally adding glycerin, substantially as described.

4. The process of manufacturing a vegetable glue, consisting in boiling seaweed in water, filtering the solution, adding dilute acid and an astringent, and heating the mass for a prolonged period, substantially as described.

5. The process of manufacturing a vegetable glue, consisting in soaking seaweed in water, pouring off the liquid, boiling the resultant mass in water, filtering the solution, adding dilute acid and an astringent, and heating the product for a prolonged period, substantially as described.

6. The process of manufacturing a vegetable glue, consisting in boiling seaweed in water, filtering the solution, adding dilute acid and an astringent, heating the mass for a prolonged period, and adding glycerin, substantially as described.

In testimony whereof we have signed our names to this specification in the presence of two subscribing witnesses.

FEODOR LEHMANN.
JOHANNES STOCKER.

Witnesses:
  HENRY HASPER,
  WOLDEMAR HAUPT.